No. 693,986. Patented Feb. 25, 1902.
D. B. SIMPSON.
HAND RAKE.
(Application filed July 17, 1901.)
(No Model.)
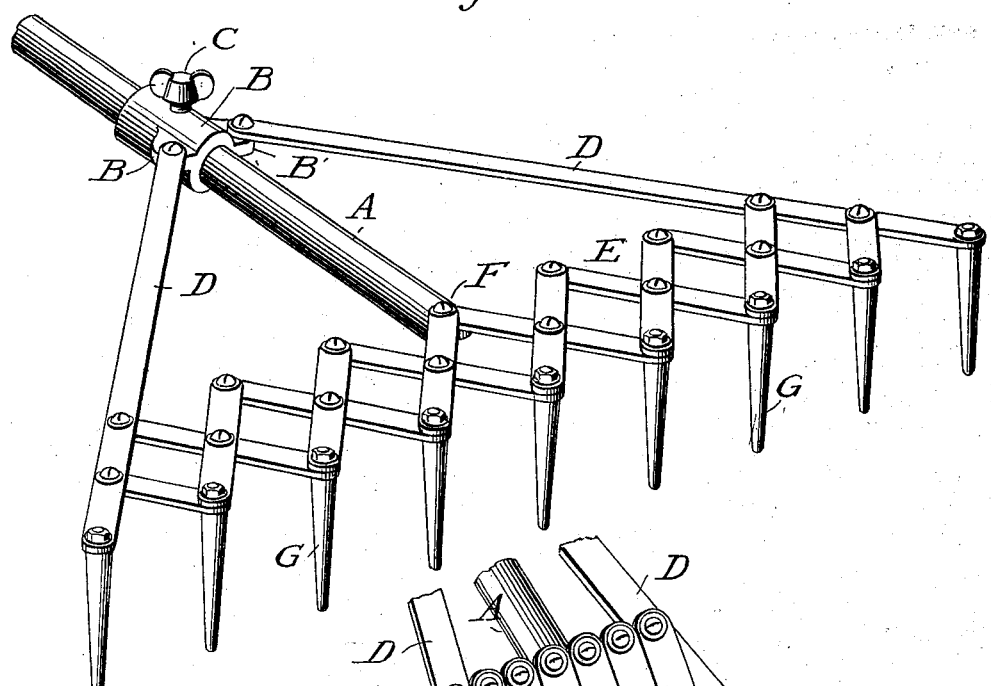
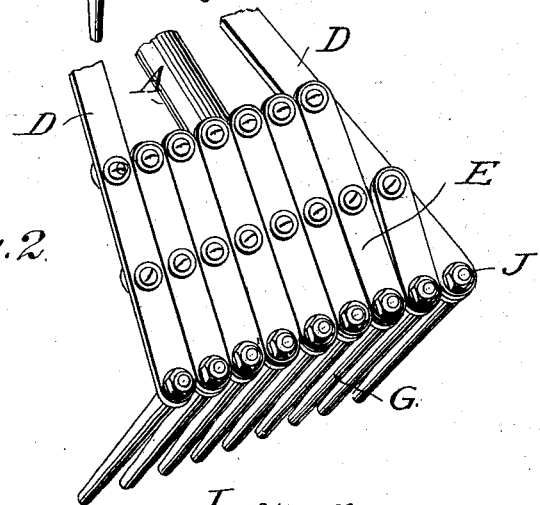
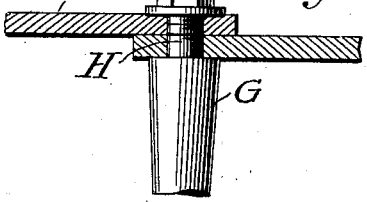
WITNESSES:
INVENTOR
Daniel B. Simpson
BY
ATTORNEY

United States Patent Office.

DANIEL B. SIMPSON, OF MOUNT STERLING, KENTUCKY, ASSIGNOR OF TWO-THIRDS TO JACOB EFFRON AND SAMUEL ROSENZWEIG, OF MOUNT STERLING, KENTUCKY.

HAND-RAKE.

SPECIFICATION forming part of Letters Patent No. 693,986, dated February 25, 1902.

Application filed July 17, 1901. Serial No. 68,635. (No model.)

*To all whom it may concern:*

Be it known that I, DANIEL B. SIMPSON, a citizen of the United States, residing at Mount Sterling, in the county of Montgomery and State of Kentucky, have invented certain new and useful Improvements in Hand-Rakes, of which the following is a specification, reference being had therein to the accompanying drawings.

My invention relates to improvements in hand-rakes; and one object of my invention is the provision of a hand-rake which can be made of different widths to adjust or accommodate the rake to various characters of work—that is, to rake fine or coarse grass, leaves, or straw, as will be readily understood.

Another object of my invention is the provision of a rake which can be adjusted to suit any character of work and which can be produced at a price which will bring it within reach of all desiring a thoroughly useful, desirable, and practical implement of this kind.

To attain the desired objects my invention consists of a hand-rake embodying novel features of construction and combination of parts, substantially as disclosed herein.

Figure 1 represents a perspective view of my novel and improved hand-rake shown in open or extended position. Fig. 2 represents a perspective view of the rake shown closed, and Fig. 3 represents a detail view showing the manner of securing the tines.

My rake is of extremely simple construction and embodies the handle or staff A, upon which is arranged or fitted the sleeve B, having the retaining or adjusting screw C, and to lugs B' on each side of the sleeve are pivoted the inner ends of the long levers D, and between the long levers are arranged the series of pivoted and connected links E, after the manner of lazy-tongs, the central set being pivoted or connected at F to the lower end of the staff or handle, and to the outer ends of the series of links are secured the upper ends of the tines G of the rake, the tines having the threaded stems H, which connect the ends of the links in series and are secured by the nuts J, which engage said threaded ends, as is obvious.

From the foregoing description, taken in connection with the drawings, the construction and operation of my rake will be readily understood, and it will be seen that the adjustment of the sleeve on the handle or staff regulates the distance between the tines, and thus adapts the rake for any kind of work, thus making the rake a perfect implement for all places where a hand-rake is desired. It will also be seen that the rake may be light in weight, but possess the necessary strength and durability, and that the rake can be produced at the proper price commensurate with its efficiency and usefulness.

I claim—

1. A hand-rake consisting of a handle or staff, an adjustable or collapsible head connected to the staff, and means for adjusting the head.

2. A hand-rake consisting of a handle or staff, a sleeve adjustable on said staff, and a collapsible head connected to the handle and sleeve and held in proper place by the sleeve.

3. A hand-rake consisting of a handle or staff, a head composed of a series of connected links after the manner of lazy-tongs, tines carried by the series of links, and devices for regulating the distance between the tines of the head.

In testimony whereof I affix my signature in presence of two witnesses.

DANIEL B. SIMPSON.

Witnesses:
C. L. MYERS,
S. M. NEWMEYER.